United States Patent
Castaneda

[19]

[11] Patent Number: 5,865,449
[45] Date of Patent: Feb. 2, 1999

[54] COMPACT SHOPPING CART

[76] Inventor: Robert Castaneda, 5380 Medical Dr., Apt. 706, San Antonio, Tex. 78240

[21] Appl. No.: 747,188

[22] Filed: Nov. 12, 1996

[51] Int. Cl.$^6$ ...................................................... B62B 3/14
[52] U.S. Cl. ............................. 280/33.996; 280/47.19; 280/47.2; 280/47.35
[58] Field of Search ............ 280/33.996, 47.19, 280/47.28, 47.29, 47.35, 47.2, 47.33, 47.34, 47.26

[56] References Cited

U.S. PATENT DOCUMENTS

| | | | |
|---|---|---|---|
| 2,901,262 | 8/1959 | Berlin | 280/47.35 X |
| 2,962,292 | 11/1960 | Edmonston | 280/33.996 |
| 3,052,484 | 9/1962 | Huffman et al. | 280/47.35 X |
| 3,272,528 | 9/1966 | Young et al. | 280/33.996 |
| 3,827,376 | 8/1974 | Solomon | 280/33.996 X |

*Primary Examiner*—Eric D. Culbreth
*Assistant Examiner*—Michael Mar
*Attorney, Agent, or Firm*—David G. Henry

[57] ABSTRACT

A cart designed to carry small to intermediate volumes of products, to be easier to maneuver than existing, full-scale shopping carts, to consume less space, both during use and when in a storage configuration, and, due to convenience and ease of use, to encourage use by customers who would otherwise avoid using any shopping cart at all. The cart provides upper and lower baskets which, as coordinated through linkage rods, move in concert between a lowered, useable configuration and a raised, storage configuration.

1 Claim, 6 Drawing Sheets

COMPACT SHOPPING CART

BACKGROUND OF THE INVENTION

1. Field of the Invention

Applicant's invention relates to non-mechanized conveyances, and to shopping carts in particular.

2. Background Information

Grocery carts are of fairly standard configuration, but all such carts known to this inventor share one common feature—they are large relative to the volume of products which a user of "express lanes" at a grocery store are likely to purchase. People who go into grocery stores "just to pick up a few things" often skip getting a shopping cart. Such customers would rather not deal with the large, cumbersome shopping carts of the prior art for the small volume of goods which they intend to purchase.

A frequent problem facing customers who forego the shopping cart is that of selecting more goods than expected. This leads to one of two results: (1) the customer does a "balancing act" trying to get their goods to the register stands; or (2) the (now irritated) customer goes back to the store front to retrieve a shopping cart.

As every grocer in particular knows, customers who try to get by without a cart often drop items. Such items may include gallon jugs of milks, sugar sacks, dozen egg cartons, and other such items as create a substantial mess (and safety hazard) when dropped to a hard grocery store floor.

These problems have been addressed to a limited degree by the advent of handled baskets which now appear near many store entrances. These carry-around baskets are good in theory. However, anyone who has used one of these baskets for even a relatively short time can attest to the resulting discomfort to the hands.

What is needed is an item which bridges the gap between full-scale shopping carts and carry-around baskets. Such a cart would ideally be somewhat smaller than existing standard shopping carts, it would be convertible between a usable configuration to a highly compact storage configuration so that grocers (and other basket-using proprietors) would not likely resist adding the carts to their floor space, and it would reliably and sturdily carry a moderate amount of cargo.

SUMMARY OF THE INVENTION

It is an object of the present invention to provide a novel shopping cart.

It is another object of the present invention to provide a novel shopping cart which is particularly useful for small to intermediate volumes of products to be purchased at a store.

It is another object of the present invention to provide a novel shopping cart which is smaller than existing shopping carts, but convertible into a configuration for storage whereby the cart is substantially smaller still.

It is another object of the present invention to provide a novel shopping cart which obviates the need for customers for limited purchases to either use a full-scale shopping cart, to use a carry-around basket, or to hand-carry all to-be-purchased goods.

In satisfaction of these and related objectives, Applicant's present invention provides designs for unique, compact shopping carts. Applicant's carts are designed to carry small to intermediate volumes of products, to be easier to maneuver than existing, full-scale shopping carts, to consume less space, both during use and when in a storage configuration, and, due to convenience and ease of use, to encourage use by customers who would otherwise avoid using any shopping cart at all.

DETAILED DESCRIPTION OF THE PREFERRED EMBODIMENT

Figure 1:
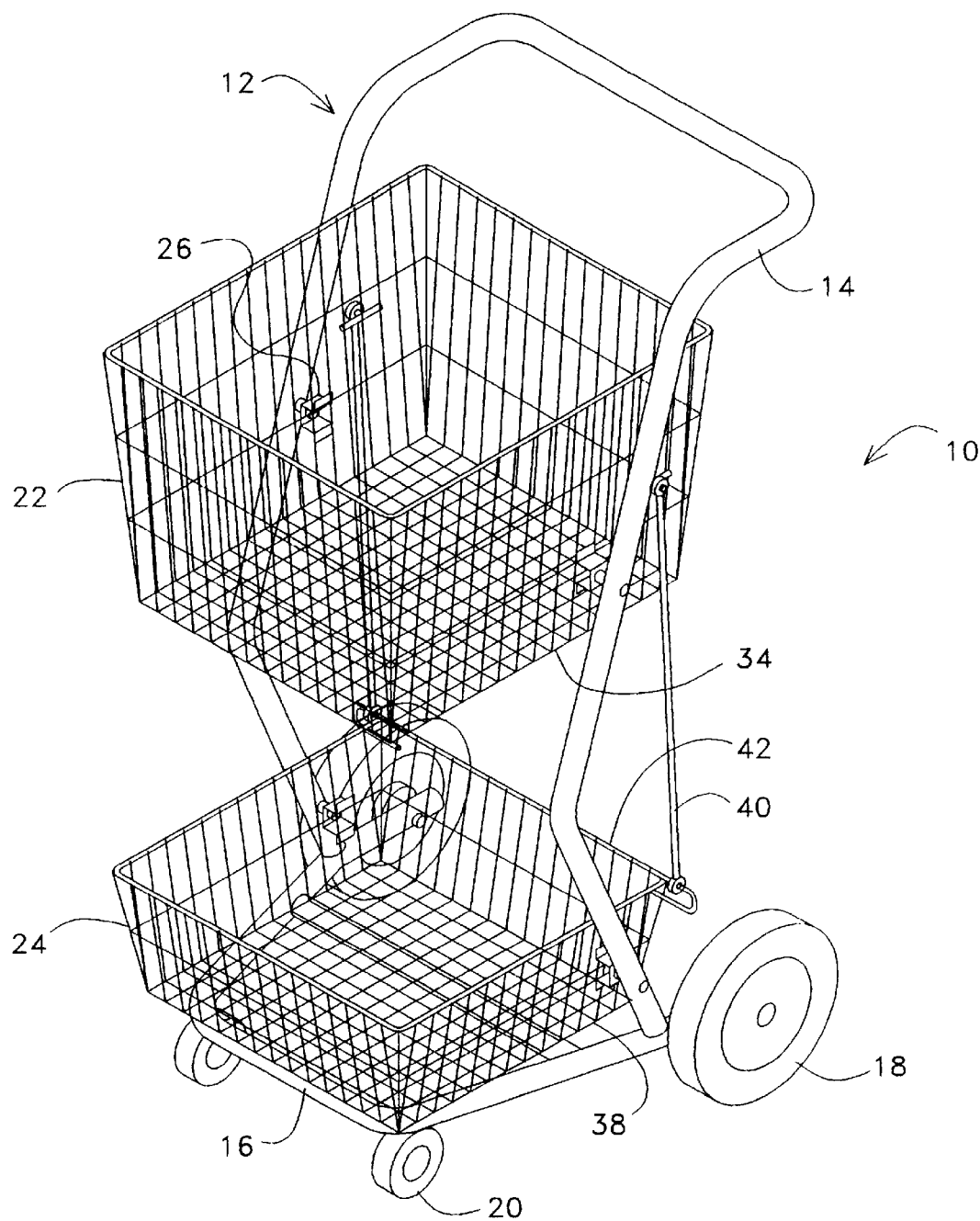
FIG. 1 is a perspective view of the preferred embodiment of the present inventor's shopping cart design with the cart in the usable configuration.
Figure 3:
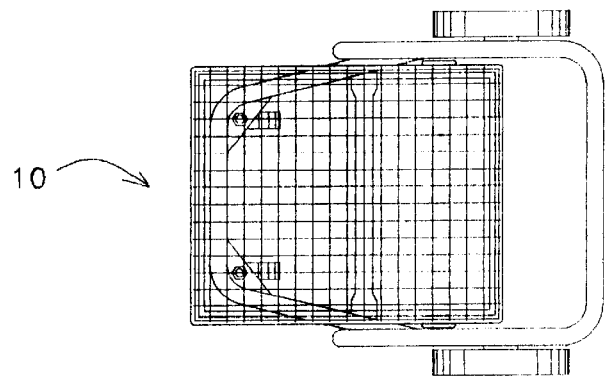
FIG. 3 is a top plan view of the cart of FIG. 1.
Figure 2:
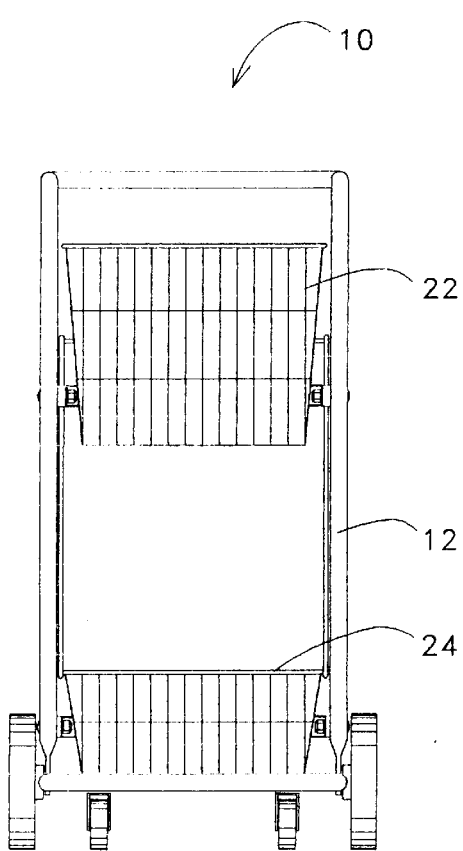
FIG. 2 is an elevational front view of the cart of FIG. 1.
Figure 4:
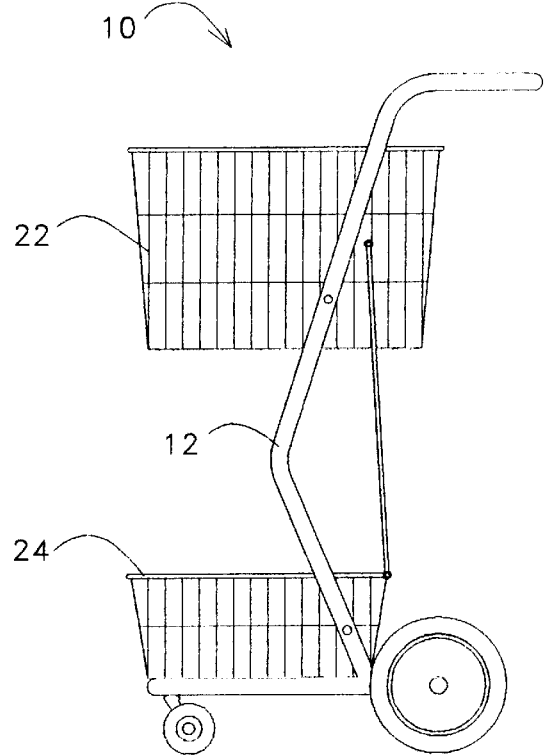
FIG. 4 is a side elevational view of the cart of FIG. 1.

Referring to FIG. 1, the preferred embodiment of the present inventor's shopping cart is identified generally by the reference numeral 10. Cart 10 includes a frame 12 with an upright handle section 14 and a chassis section 16. Cart 10 rolls about on rear wheels 18 and forward wheels 20. Forward wheels 20 may swivel according to conventional design, or may be fixed in view of each with which slightly downward pressure allows a user to pivot cart 10 to differing directions with cart 10 riding only on rearward wheels 18.

Rotatably attached to upright handle section 14 of frame 12 as shown in FIG. 1 is an upper basket 22 and a lower basket 24. Baskets 22 and 24 are attached to upright handle section 14 by way of rotatable brackets 26. In the preferred embodiment, brackets 26 are positioned relative to baskets 22 and 24 whereby baskets 22 and 24 rotate about a point which is approximately one-fourth of each basket's length from their respective rearward faces 28 and 30. In addition, brackets 26 are positioned, relative to upper basket 22, at points approximately near the bottom side margins 34, and relative to bottom basket 24, approximately one-half of the distance between the top side margins 36 and bottom side margins 38.

Pivotally attached at opposite rod ends to baskets 22 and 24, on opposite sides of baskets 22 and 24, are rods 40. In the preferred embodiment of cart 10, rods 40 are attached at upper rod ends to points rearward and superior to the attachment points between basket 22 and upper handle section 14 as shown in the figures. At lower rod ends, rods 40 are attached to lower basket 24 at points on either side of basket 24 at the respective side junctures between the top side margins 36 and top rear margin 42.

Figure 5:
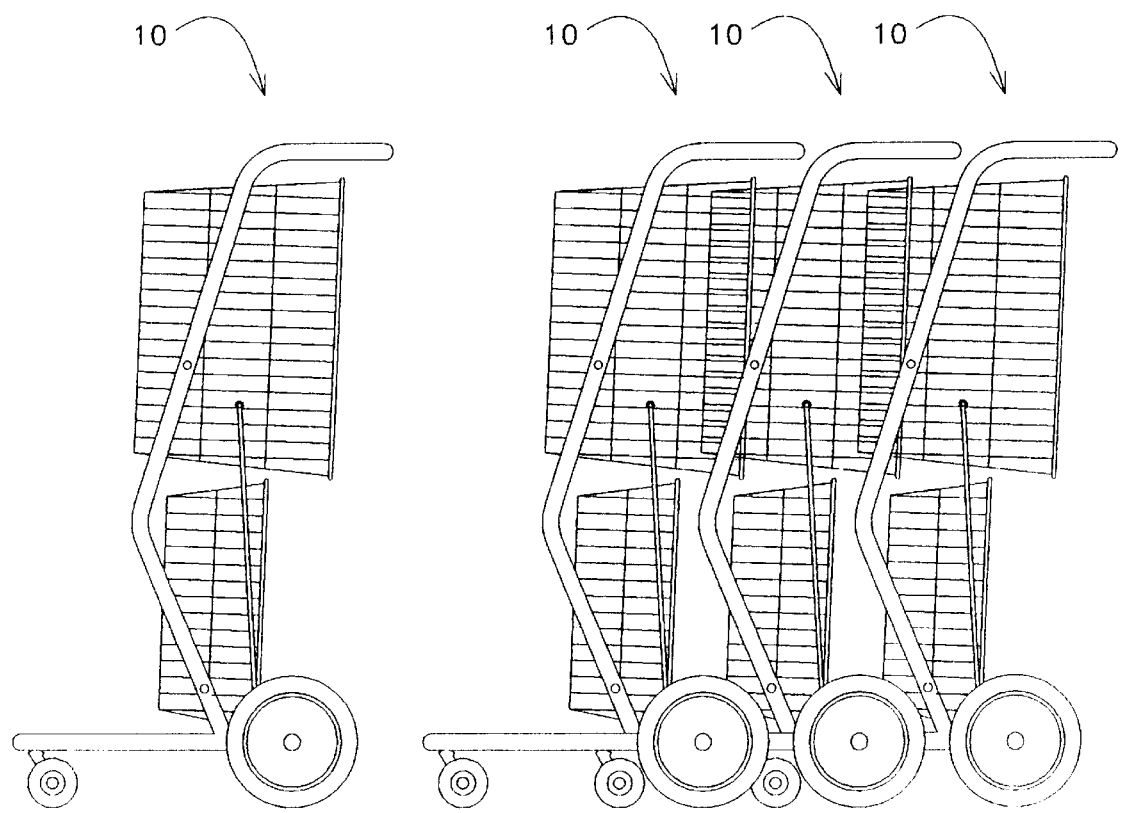
FIG. 5 is a side elevational view of a number of carts, as in FIG. 1, such carts being in the storage configuration.

The spatial relationship between the points of attachment between baskets 22 and 24 and upright handle section 14 on the one hand, and the points of attachment between baskets 22 and 24 and rods 40 creates a mechanical relationship whereby rotating one basket 22 or 24 (such as raising it from a lowered position such as shown in FIG. 1 to a raised position as shown in FIG. 5) necessarily causes a corresponding and equivalent action by the other basket. This dynamic relationship is depicted in the range-of-motion depiction of FIG. 6.

Figure 6:
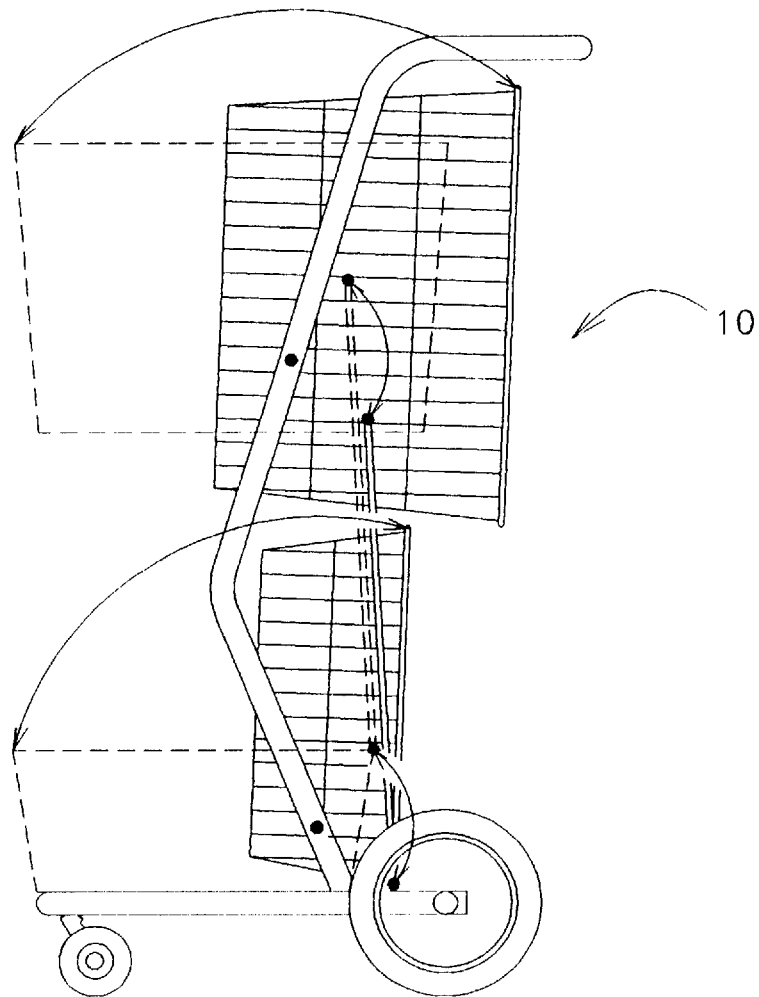
FIG. 6 is a range-of-motion depiction showing the dynamic relationship between the upper and lower baskets as effected by the linkage rods.

The cooperatively linked movement between upper and lower baskets 22 and 24 renders cart 10 very easy to convert between the storage configuration shown in FIGS. 5 and 6 and the in-use configuration shown in the other figures. Were this not the case, cart 10 would, as a practical matter have to have only one basket 22, for independently having to raise or lower baskets 22 and 24 would constitute a considerable practical deterrent to customer and proprietor acceptance of the design. This, in turn, would diminish the capacity of cart 10 which is, notwithstanding its compact configuration and ease of use, quite substantial as a product of having both baskets 22 and 24.

Referring to FIG. 5, it can be readily appreciated how the design of basket 10 serves to conserve floor space when in the depicted storage configuration.

Figure 7:
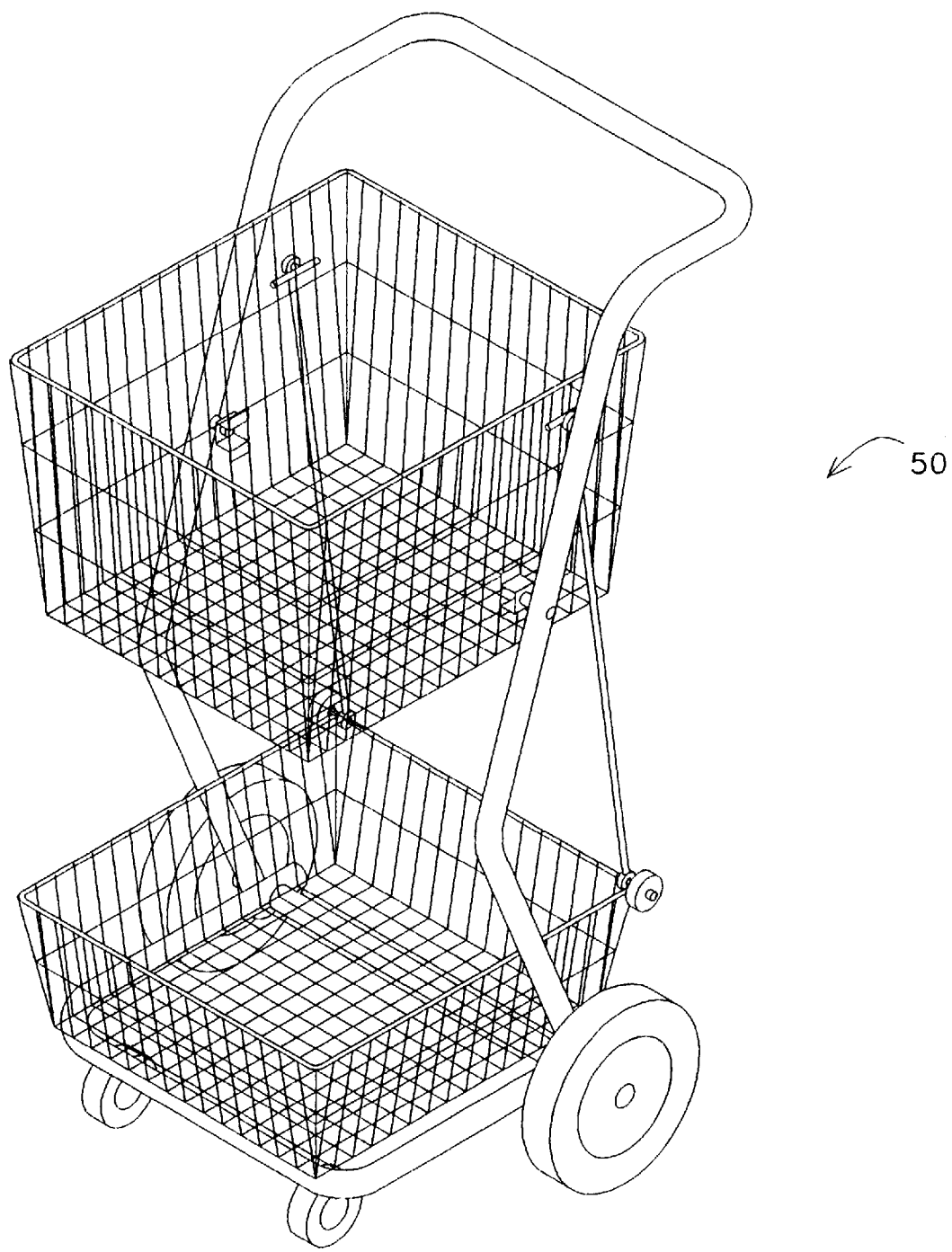
FIG. 7 is a perspective view of an alternative embodiment of the present inventor's shopping cart design with the cart in the usable configuration.
Figure 8:
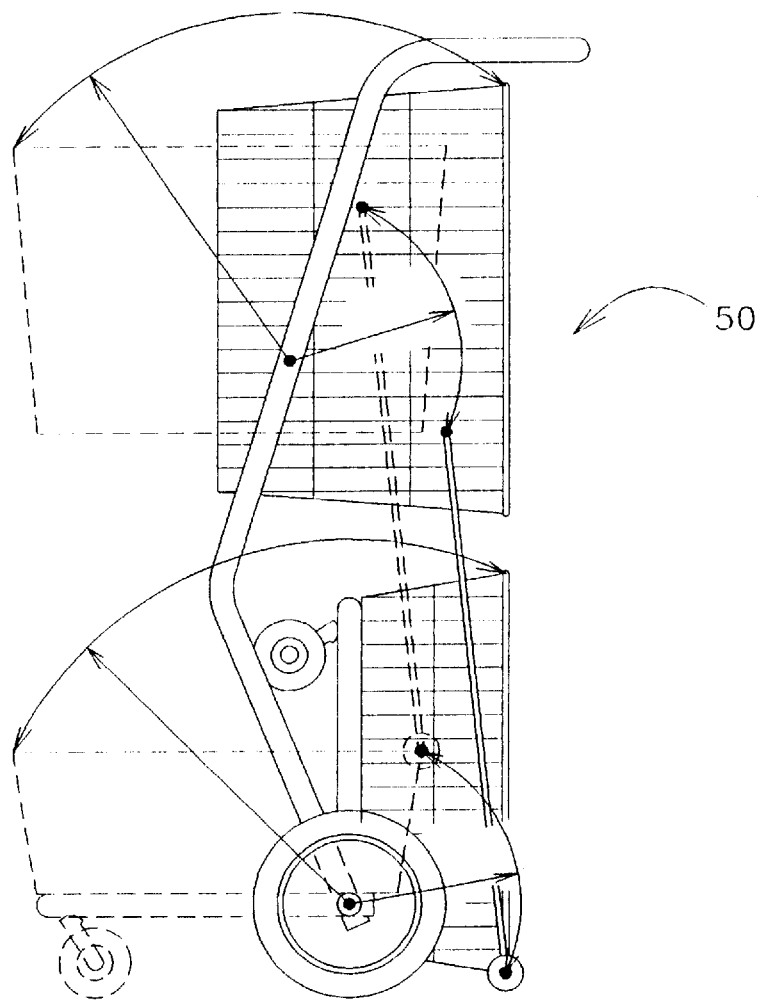
FIG. 8 is a range-of-motion depiction for the cart of FIG. 7 showing the dynamic relationship between the upper and lower baskets (and affected lower frame section) as effected by the linkage rods.

Referring to FIGS. 7 and 8, an alternative embodiment (cart 50) of the present inventor's design is shown. Cart 10 is, however, preferred over the cart 50 embodiment because of the greater stability provided by the chassis section 16 which, unlike the corresponding component in cart 50, remains squarely on a floor surface both when in the useable and storage configurations. FIG. 7 shows a pair of wheels attached to the rearward end of the lower basket. When the baskets are pivoted to their storage configuration as shown in FIG. 8, the pair of wheels on the lower basket are positioned for engagement with the floor surface. Nevertheless, cart 50 clearly incorporates the present invention.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A shopping cart comprising:

an elongate support frame having a handle at an upper end and a subframe pivotally attached at a rearward end to a lower end of the elongate support frame;

an upper basket member;

a lower basket member;

said upper basket member being pivotally attached to said support frame at an attachment point along said elongate support frame;

said lower basket member being fixedly attached to said subframe and spaced apart from said upper basket member point;

linkage means attached at opposite linkage means ends to said upper and lower baskets whereby rotational movement of one of said upper and lower baskets about attachment points to said elongate support frame effects a corresponding rotational movement of said other upper and lower basket between extended and retracted positions; and a pair of ground engaging wheels rotatably attached to the lower end of said elongate support frame, at least one wheel rotatably attached to a forward end of said subframe for ground engagement when the basket members are pivoted to their extended position, and at least one wheel rotatably attached to a rearward end of said lower basket member for ground engagement when the basket members are pivoted to their retracted position.

* * * * *